United States Patent [19]
Peterson

[11] 3,849,091
[45] Nov. 19, 1974

[54] CLOSED LOOP AIR FILTRATION SYSTEM

[75] Inventor: Bertil G. Peterson, Bloomington, Minn.

[73] Assignee: Tobin-Arp Manufacturing Company, South Minneapolis, Minn.

[22] Filed: Apr. 17, 1972

[21] Appl. No.: 244,691

[52] U.S. Cl.................. 55/302, 55/338, 55/341, 55/429
[51] Int. Cl............................................ B01d 46/04
[58] Field of Search...... 209/144; 55/288, 301, 302, 55/303, 305, 338, 341, 342, 385, 429; 51/273, 8

[56] References Cited
UNITED STATES PATENTS

| | | | |
|---|---|---|---|
| 1,509,912 | 9/1924 | Stebbins | 55/303 |
| 2,276,805 | 3/1942 | Tolman, Jr. | 55/288 |
| 2,335,315 | 11/1943 | Seymour | 55/305 |
| 2,935,820 | 5/1960 | Mead | 51/8 |
| 3,057,137 | 10/1962 | Perlis et al. | 55/341 |
| 3,478,883 | 11/1969 | Deluca, Jr. | 210/333 |
| 3,646,730 | 3/1972 | Reid | 55/302 |
| 3,716,971 | 2/1973 | Reinauer | 55/302 |

Primary Examiner—Bernard Nozick

[57] ABSTRACT

Circulation air is used in an air blast cleaning machine to carry cleaning agent beads and unwanted particles from the machine. This air is separated from the beads, filtered to remove unwanted particles and returned in a closed air feed loop to the machine. An airstream made up of the circulation air and the unwanted particles is discharged downwardly into porous, vertical, flexible, filtration sleeves and the filtered air passing through these sleeves is returned back to the top of the cleaning machine. Unwanted particles stopped by the sleeves, fall to a collection chamber beneath the sleeves. Build up of particles on the sleeves tending to clog the sleeves is cleared by momentary reversal of airstream flow from outside the sleeves to inside thereof.

4 Claims, 3 Drawing Figures

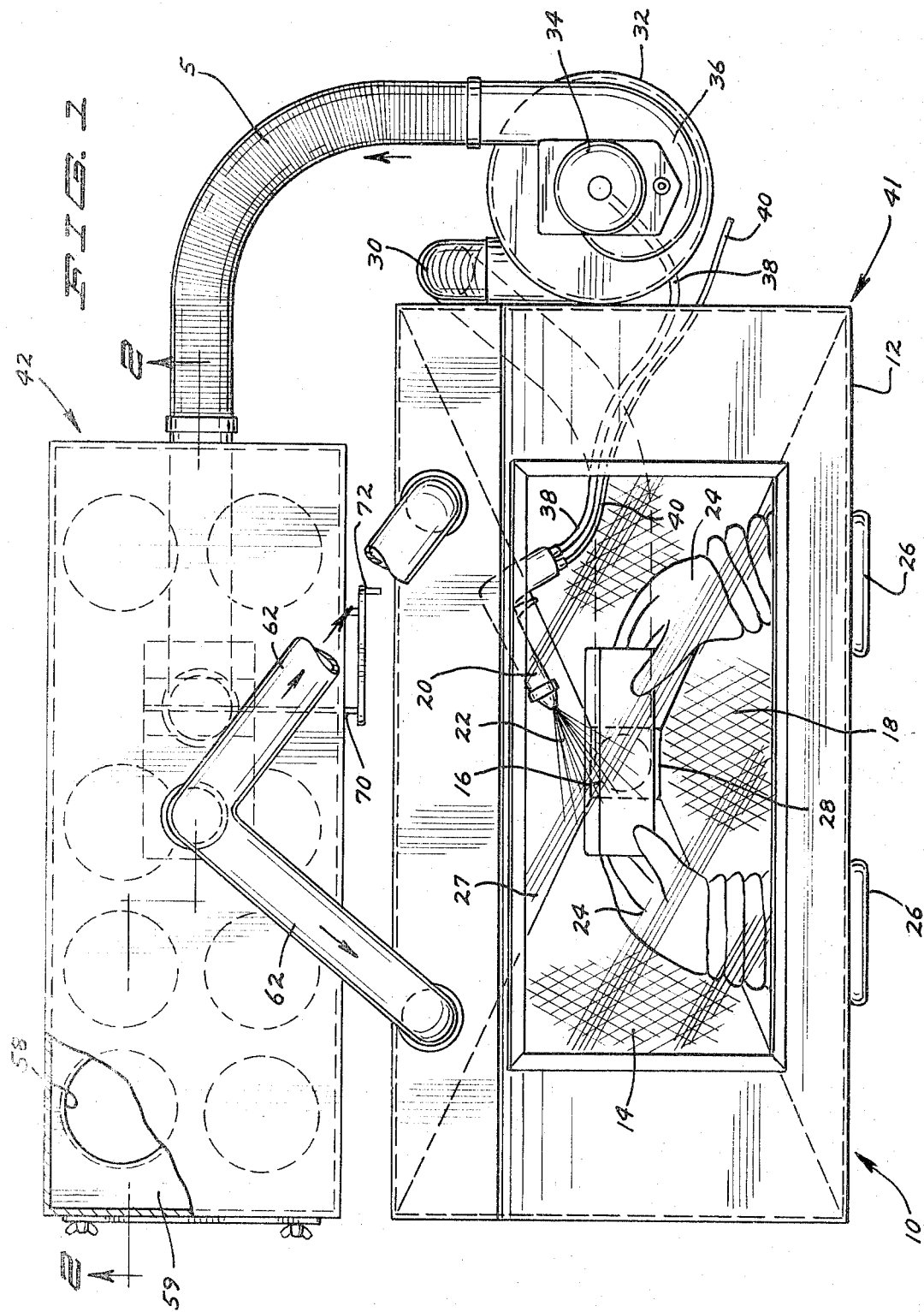

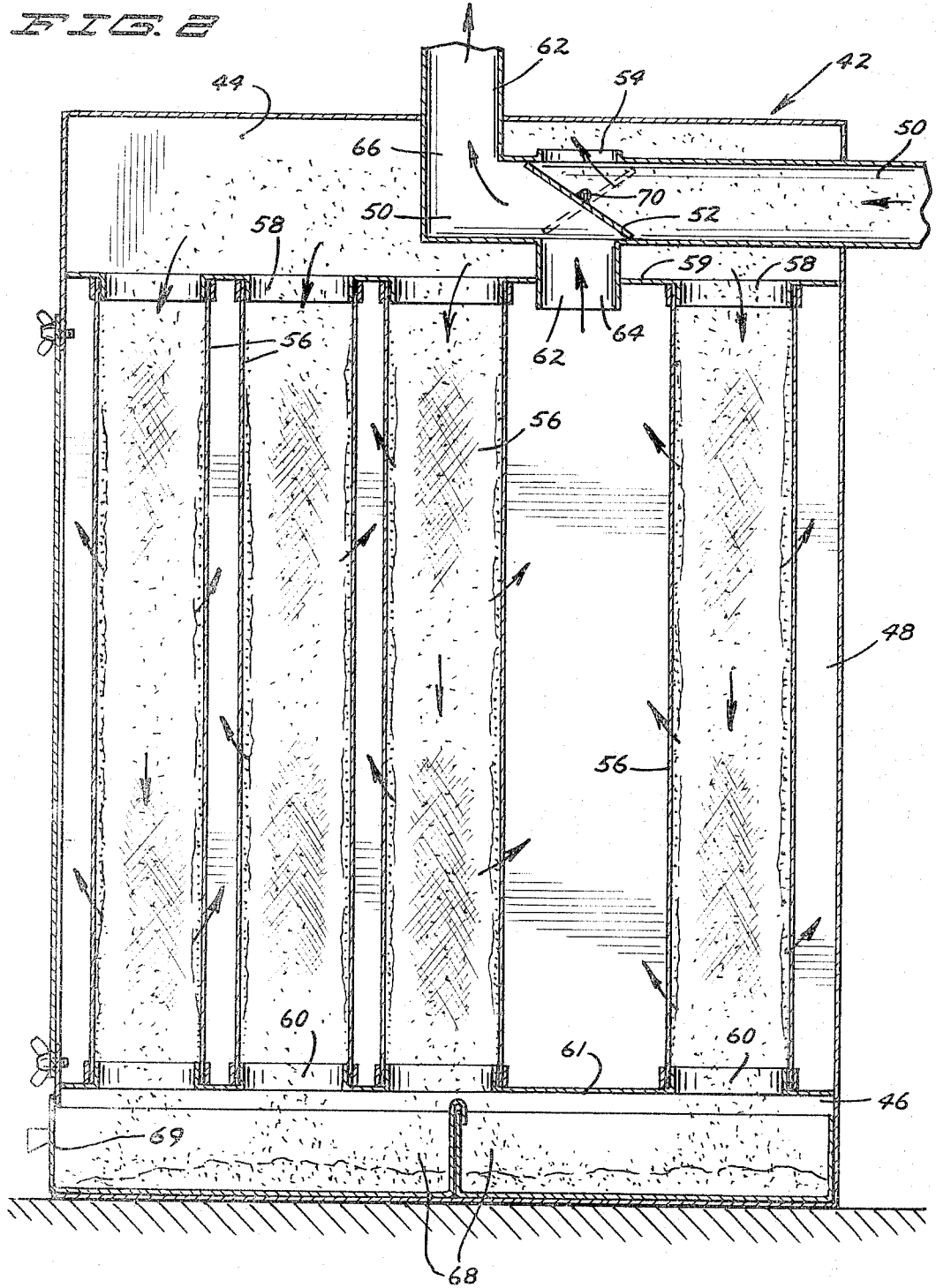

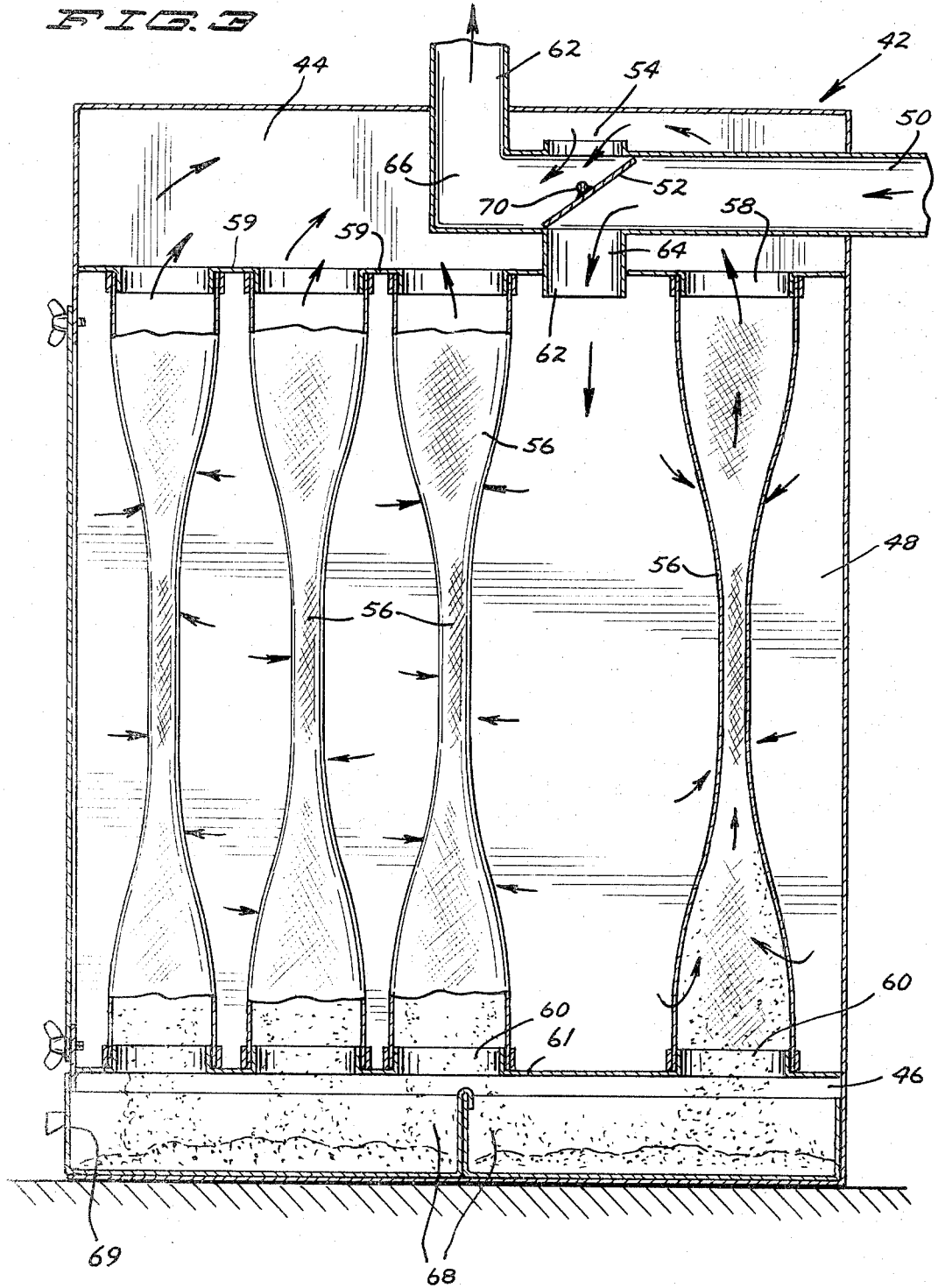

3,849,091

CLOSED LOOP AIR FILTRATION SYSTEM

BACKGROUND OF THE INVENTION

This invention has relation to the air handling of blasting or cleaning agents and unwanted particles which are blasted from the work in the process of using such agents, and particularly with regard to the separation of such unwanted particles from the entraining air after they and the entraining air are separated from the cleaning agent. Specifically, the invention relates to the handling of such entraining air and unwanted particles in such a manner as to prevent contamination of the ambient atmosphere by said entraining air and unwanted particles.

At the present time, articles are cleaned, peened or blasted to remove unwanted rust, carbon, scale, etc. by placing the article to be cleaned inside of a substantially airtight cleaning machine and bombarding the article with discrete particles of a cleaning agent such, for example, as glass beads, aluminum oxide particles, silicone, sand, steel shot, walnut shells and the like.

Often a high velocity is imparted to the cleaning agent by entraining the agent in a high velocity, relatively low volume, airjet of relatively small cross-sectional area and directed at the article through an air gun. Alternatively, however, there are mechanical action slingers which impel such things as steel shot and walnut shells and the like toward the work without using a high velocity airstream.

Customarily, such cleaning machines are funnel-shaped at the bottom, and the cleaning agent, together with all of the unwanted particles removed from the work by the action of that agent, fall to the bottom of the machine and are carried out the bottom of the funnel to means for separating the cleaning agent from the unwanted particles so that the cleaning agent can be reused. A cyclone separator is often used for this purpose, and the mixture of cleaning agent and unwanted particles is air entrained and discharged circumferentially into the separator where the cleaning agent is separated out.

Before the present invention, the entraining air and the unwanted particles were customarily fed to a large filter bag, not unlike a vacuum cleaner bag, where, according to the theory, the unwanted particles lodged against the inside cover of the bag, and the entraining air passed outwardly therefrom into the atmosphere adjacent and surrounding the air blast cleaning machine.

In any such operation, dust size unwanted particles pass more or less freely through the sides of the filter bag and into the atmosphere. This presents a real health hazard to those working with and near such machines; and also contributes substantially to the general pollution of the atmosphere to the detriment of all. In a typical installation, only one of these cleaning machines will discharge over 200 cubic feet of polluted air per minute into the atmosphere.

A further similarity to the operation of the vacuum cleaner bag is seen in that the filter bag is at its maximum efficiency only just after it has been emptied. Thereafter as the particles adhere to the interior of the bag, and/or build up in the bottom of the bag to completely blanket large areas of the bag, the pressure builds up within the bag and more and larger dust particles are discharged therethrough.

BRIEF SUMMARY OF THE INVENTION

Air entrained discrete blasting and cleaning agents such as glass beads and unwanted particles discharging from a substantially airtight cleaning machine are fed to a cyclone separator where the beads are removed for later reuse. The remaining airstream made up of circulation air and unwanted air entrained particles is fed to an upper plenum of a substantially airtight filter box. A bottom portion of this filter box includes a spaced apart airtight collection chamber. The interior of porous, vertical, flexible, filtration sleeves are open from the plenum to the chamber. The portion of the filter box between the plenum and the chamber is known as the filtration compartment and receives air from the airstream after it is passed through the plenum and down into and through the sleeves. The unwanted particles are stopped by the sleeve walls, and fall through the sleeves into the collection chamber. The filtered air passes from the filtration compartment up out of the top of the filter box and into the top of the cleaning machine where it again entrains the glass beads and the subsequently generated unwanted particles.

Thus fine dustlike particles not stopped by the vertical porous filtration sleeves do not reach and cannot therefore pollute the ambient atmosphere.

Any tendency for the unwanted particles to clog the interior of the sleeves is overcome by means provided to periodically direct the airstream from the cyclone separator directly into the filtered air compartment thus to cause instantaneous flow back through the sleeves and into the plenum where said flow is simultaneously momentarily diverted directly back to the top of the cleaning machine. This causes the sleeves to be flexed and to tend to collapse, to force unwanted particles adhering to the interior surfaces of the sleeves to be dislodged and to fall into the collection chamber.

Trays in the collection chamber receive particles falling into the chamber and can be periodically removed, emptied, and replaced while the cleaning machine is shut down to replace the article to be cleaned. In this way unwanted particles never reach a height where they will blanket off any of the lower portions of the filtration sleeves.

IN THE DRAWINGS

FIG. 1 is a top plan view of the filtration system of the present invention including a blast type cleaning machine, a cyclone separator, a filter box, the entrance airstream passageway from the separator to the filter box and the return passageways from the top of the filter box to the top of the cleaning machine;

FIG. 2 is a vertical sectional view of the filter box of FIG. 1 taken on line 2—2 in FIG. 1; and FIG. 3 is a further vertical sectional view also taken on the line 2—2 in FIG. 1, but showing a momentary reversal of the usual air path through the box.

DESCRIPTION OF PREFERRED EMBODIMENT

An air blast cleaning machine 10 includes a substantially airtight enclosure 12 provided with an upper sight glass 14 which permits viewing of work article 16 to be cleaned, peened or blasted or other work articles which can be inserted into the machine. Also as seen through the sight glass, a horizontal screen 18 or other air and particle pervious floor is for supporting the article 16 or other work to be cleaned, and an air gun 20 can be fixedly mounted within the machine enclosure 12, or manually held, to direct a jet 22 of air and air entrained cleaning agent such as discrete particles of glass beads against the work for performing the cleaning, peening or blasting operations on the work. Customarily, rubber gloves 24,24 are sealed to openings 26,26 in the enclosure 12 so that the operator's hands can be used inside of the machine to handle the article 16 to be cleaned, or the gun or both.

A bottom wall 27 of the cleaning machine enclosure 12 slopes downwardly to a center portion 28, so that all of the glass beads or other cleaning agent, and all of the unwanted particles cleaned from the work article 16 and any other loose particles in the cleaning machine will fall or be carried by the flow of air down through the lower center portion 28 and into a cleaning machine discharge conduit 30 which extends underneath the bottom of the cleaning machine and up to the top portion of a cyclone separator or classifier 32. This separator includes impellers and fans of any usual or preferred construction driven by motor 34 which also drives centrifugal exhaust fan 36. These fans and impellers driven by motor 34 draw sufficient circulation air through the center opening 28 in the floor 27 of the cleaning machine to carry the beads and unwanted particles into the separator 32. The particular structure of this separator 32 forms no part of the invention except that it draws in the circulation air, beads, and unwanted particles, separates out the air and particles and causes the glass beads or other cleaning agent to be collected in the bottom thereof and to be discharged through a cleaning agent return line 38, which line goes through proper reservoir and controls back to air gun 20 for reuse of the cleaning agent. A high pressure air supply line 40 from a source of compressed air (not shown) also goes through the proper controls to the air gun 20. The foregoing structures are all part of the prior art. Typically the discharge airstream, made up of the circulation air and the unwanted particles, left the centrifugal exhaust fan 36 and was fed directly into a large porous bag, like an enormous home vacuum cleaner bag, where the conveyor air could escape through the sides of the bag into the surrounding area, the unwanted particles being stopped by the bag, and, theoretically, falling to the bottom thereof where they could be emptied out. Typically, then, the air blast cleaning machine did not include a substantially airtight enclosure, but had to have very substantial openings therein to continually draw through make up air to provide circulation sufficient to convey the beads and the unwanted particles from the bottom thereof to the top of the centrifugal separator.

In the system and apparatus of the invention, the circulation air, which moves the beads and the unwanted particles into the separator, is never allowed to leave the system and travels around a closed filtration loop and back into the top of the substantially airtight enclosure 12 of the cleaning machine 10.

The cleaning machine, the cyclone separator and the conduits and lines therebetween are designated as the cleaning machine assembly 41.

In addition to the elements of the prior art structure as set out above, the apparatus of this system includes a filter box 42 having an airtight plenum 44 forming a top portion thereof, an airtight collection chamber 46 forming the bottom portion of the filter box, and an intermediately spaced airtight filtration compartment 48 constituted as that portion of the filter box between the plenum 44 and the collection chamber 46.

An airstream conduit 50 carries the circulation air and unwanted particles from the discharge point of the centrifugal exhaust fan 36 and discharges this airstream against a baffle plate flap valve 52 upwardly through an opening 54 in the conduit 50 and inside of the plenum 44.

A plurality of porous, vertical, cylindrical as shown, flexible, filtration sleeves 56 are each supported in sealing relationship to a downwardly extending collar 58 in a bottom wall 59 of the plenum and to an upwardly extending collar 60 in an upper wall 61 of the collection chamber 46. A filtered air conduit 62 extends from the interior of the filtration compartment 48, up through the plenum 44, and over into the top of the substantially airtight enclosure 12 of the cleaning machine 10.

As shown, this conduit is bifurcated so as to direct the filtered air into the top of the enclosure 12 at two different places thus to insure that circulation air will move substantially completely through the enclosure 12 as it is recycled, in a manner to be explained.

As will be most clearly seen in FIG. 2, the filtered air conduit 62 includes a lower collar 64 extending from inside of the filtration compartment 48 to a continuation of airstream conduit 50, which continuation also forms a part of the filtered air conduit. An upper vertical conduit section 66, open to the extension of the airstream conduit 50 also forms a part of the filtered air conduit 62, as does the back side of the baffle plate flap valve 52, in normal operation of the system of the invention.

The collection chamber 46 is equipped with two clean-out trays 68,68 as shown, the first of which has a front wall 69 which serves to form part of the wall of the collection chamber. When unwanted particles fall into the collection chamber, they will land in the clean-out trays, and can be periodically removed when the machine is shut down, as, for example, when the work article 16 has been cleaned and is being replaced with an untreated work article.

As best seen in FIG. 1, the baffle plate flap valve 52 has an operating rod 70 extending outwardly therefrom to a handle 72 so that the flap valve can be operated from position as seen in FIG. 2 to a position as seen in FIG. 3 and back again.

OPERATION:

With the cleaning machine in operation, the separator motor 34 will be activated to cause, among other things, the circulation air to be drawn through lower center portion 28 of the bottom wall 27 of the airtight enclosure 12, and to carry with it the glass beads and unwanted particles which fall from the vicinity of the work article 16 after the beads have accomplished their purpose. The beads are separated from the circulation air and the unwanted particles and the resulting airstream is discharged through the centrifugal exhaust fan 36 into the airstream conduit 50, against the baffle plate 52, and into the plenum 44. Here the airstream enters the various vertical sleeves 56, and the air passes through the porous sleeves and to and out of the filtered air conduit 62. In a typical installation, the interior area of the sleeves available for the passage of air therethrough will be about three times the area of the cloth bag typically used with a comparable machine. This allows less resistance to airflow, and there is, therefore, less tendency to force unwanted particles through the filter sleeves. The pressure gradient from the inside to the ouside of the sleeves will be less at each point than that from the inside to the outside of the prior cloth bag, thus reducing the tendency of particles to be held against the sleeve.

Since some of the unwanted particles are dust size, and even smaller, they can be expected to pass in some quantity through the sleeves with the so called "filtered" air. The particles which are stopped by the sleeves will tend to fall vertically through the sleeves and into the collection chamber for later removal as explained above.

As in the case of the large filter bag discharging into the atmosphere, however, there will be some, although lesser, tendency for unwanted particles to adhere to the interior surface of the vertical sleeves. When a drop in efficiency of the airflow through the system is noted, handle 72 will be operated to cause rod 70 to move the baffle plate flap valve 52 from the position as seen in FIG. 2 to the position as seen in FIG. 3. Then the airflow pattern will be from the airstream conduit 50 down into the filtration compartment 48, and through the sleeves from the outside toward the inside, back up into the plenum, down through the opening 54 in the airstream conduit 50 (now actually forming a part of the filtered air conduit 62), and out of the conduit 62. This operation of the flap valve causes the sleeves to be quickly flexed and to tend to collapse to position as suggested in FIG. 3, thus "shaking" and forcing the unwanted particles off of the interior surfaces of the sleeves where they will fall vertically through the sleeves into the clean-out trays 68. If this flow is continued long enough, virtually all of the relatively light unwanted particles will fall through the sleeves, and then a further reversal back to the normal operating condition will not result in the cleared out unwanted particles again becoming lodged on the interior surface of the surfaces of the sleeves. Any particles coming into the filtration compartment as a result of this reversal will simply pass out through air conduit 62 when normal operations resume. However, this back flow technique can be reserved for use when the blasting air gun 20 is not generating any more unwanted particles.

In any event, the flow out through filtered air conduit 62 is to the top of the cleaning machine 10, where this circulation or filtered air will again move throughout the enclosure 12 on its way to be once again recycled through the center portion 28 of the bottom wall of the enclosure.

The obvious advantage of the structure of the present invention is that any dust particles which do get through the filtration system and come back into the cleaning machine are simply going to be recycled and are not available to contaminate or pollute the atmosphere.

A less obvious advantage lies in the fact that the entire system is run dry, whereas systems of the prior art tended to get steamy and foggy inside of the sight glass of the cleaning machines due to the circulation of air on humid days and due to temperature differentials between the inside and the outside of the cleaning machine because of the presence of electric lights in the machine, for example. By recirculating the same air over and over, there is no change in moisture content, and the sight glass will remain clear, and any "fog" caused by the impinging of the work, on the owrk, for example, will be quickly carried away by the circulation air.

In the form of the invention described circulation airflow on the order of 200 cubic feet per minute is achieved. Typically the volume of air added to this total from the high pressure air supply line 40 and air gun 20 is on the order of 20 cubic feet per minute. In order to stabilize pressures inside of the system, this excess air can be bled off by providing an opening in filtered air conduit 62 or at some other appropriate place "downstream" of the filtration compartment and before additional unwanted particles again occur. A filter similar to an automotive air filter can be installed over such an opening.

In the case of cleaning machines, where mechanical action is used to impel steel shot, walnut shells or the like at the work, no pressure buildup will take place and an entirely closed loop system can be used.

An embodiment of the invention in which an exclusive property or privilege is claimed are defined as follows:

1. An airtight filter box including an airtight plenum across the top thereof, an airtight collection chamber across the bottom of said box and vertically below the plenum, an airtight filtration compartment between said collection chamber and said plenum, a plurality of vertical, porous filtration sleeves each open at an upper end to the inside of said plenum and at a lower end to the inside of said collection chamber and each extending through the filtration compartment, first conduit means extending into the plenum for introducing a stream of air to be filtered into the box, second conduit means extending outwardly from the plenum, a first collar extending from the plenum into the filtration compartment in spaced relation to said vertical sleeves, a second collar open to the inside of said plenum, valve means in said plenum between said conduit means and said collars, said valve means including a valve element movable between a first position wherein said first conduit means discharges air to be filtered into said plenum through said second collar and said second conduit means receives filtered air from said filtration compartment through said first collar and a second position wherein said first conduit means discharges air into said filtration compartment through said first collar and said second conduit means receives air from said plenum through said second collar.

2. A closed loop air filtration apparatus including:
A. an airtight filter box as set out in claim 1 including said first and second conduit means;
B. a substantially airtight cleaning machine which generates unwanted particles and continuously discharges them in a stream of circulation air into said first conduit means and which continuously receives air from said second conduit means, said conduit means each being open to the inside of said machine; and
C. means for circulating air around said closed loop.

3. The filter box of claim 1 wherein the filtration sleeves are flexible.

4. The filter box of claim 3 wherein at least one tray is situated in said collection chamber to receive fall out materials from said filtration sleeves, said tray being removable from said chamber to dispose of said fall out materials.

* * * * *